United States Patent
Chen

(10) Patent No.: US 10,225,879 B2
(45) Date of Patent: Mar. 5, 2019

(54) DEVICE AND METHOD OF HANDLING A USER EQUIPMENT ACCESS STRATUM CONTEXT

(71) Applicant: HTC Corporation, Taoyuan (TW)

(72) Inventor: Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/715,131

(22) Filed: Sep. 25, 2017

(65) Prior Publication Data
US 2018/0213575 A1 Jul. 26, 2018

Related U.S. Application Data

(60) Provisional application No. 62/450,582, filed on Jan. 26, 2017.

(51) Int. Cl.
*H04L 1/18* (2006.01)
*H04W 76/27* (2018.01)
(Continued)

(52) U.S. Cl.
CPC ............ *H04W 76/27* (2018.02); *H04W 76/11* (2018.02); *H04W 76/25* (2018.02); *H04W 76/30* (2018.02);
(Continued)

(58) Field of Classification Search
CPC ... H04W 84/045; H04W 76/04; H04W 76/06; H04W 76/19; H04W 72/1273;
(Continued)

(56) References Cited

U.S. PATENT DOCUMENTS

2013/0039287 A1* 2/2013 Rayavarapu ........ H04W 68/005
370/329
2014/0321371 A1* 10/2014 Anderson ............. H04W 76/38
370/329

FOREIGN PATENT DOCUMENTS

EP 2557890 A1 2/2013

OTHER PUBLICATIONS

3GPP TS 36.331 V14.1.0, Dec. 2016.
(Continued)

*Primary Examiner* — Phuoc H Doan
(74) *Attorney, Agent, or Firm* — Winston Hsu

(57) ABSTRACT

A communication device for handling a user equipment (UE) access stratum (AS) context comprises a storage device for storing instructions and a processing circuit coupled to the storage device. The processing circuit is configured to execute the instructions stored in the storage device. The instructions comprise establishing a radio resource control (RRC) connection with a network; receiving the UE AS context from the network; receiving a RRCConnectionRelease message configuring the communication device to suspend the RRC connection and enter a RRC_IDLE state; storing the UE AS context, when receiving the RRCConnectionRelease message; restoring the UE AS context, resuming a signalling radio bearer 1 (SRB1) and transmitting a RRCConnectionResumeRequest message, when initiating a RRC connection resume procedure; receiving a RRCConnectionSetup message or a RRCConnectionReject message in response to the RRCConnectionResumeRequest message; and releasing the UE AS context and the SRB1 in response to the RRCConnectionSetup message or the RRCConnectionReject message.

18 Claims, 3 Drawing Sheets

(51) Int. Cl.
*H04W 76/30* (2018.01)
*H04W 76/11* (2018.01)
*H04W 76/25* (2018.01)
*H04W 28/02* (2009.01)
*H04W 72/04* (2009.01)

(52) U.S. Cl.
CPC ........ *H04W 28/02* (2013.01); *H04W 72/0453* (2013.01)

(58) Field of Classification Search
CPC ... H04W 72/042; H04W 76/02; H04W 36/08; H04W 76/30; H04W 60/005
USPC .............. 370/229, 331, 329; 455/509, 422.1
See application file for complete search history.

(56) References Cited

OTHER PUBLICATIONS

3GPP TS 36.323 V14.1.0, Dec. 2016.
3GPP TSG-RAN2 Meeting #97 R2-1701393, Feb. 2017.
Search Report dated Apr. 12, 2018 for EP application No. 17193615.6, pp. 1-6.
Ericsson (Rapporteur), "CR to capture C-IoT optimizations for non-NB-IoT UEs", 3GPP TSG-RAN WG2 Meeting #94, R2-164519, May 23-27, 2016, Nanjing, China, XP051119918, pp. 1-51.
Intel Corportation, "Lightly connected and RAN configured DRX cycle", 3GPP TSG-RAN WG2 Meeting #95bis, R2-166693, Oct. 10-14, 2016, Kaohsiung, XP051151171, pp. 1-18.

\* cited by examiner

DEVICE AND METHOD OF HANDLING A USER EQUIPMENT ACCESS STRATUM CONTEXT

CROSS REFERENCE TO RELATED APPLICATIONS

This application claims the benefit of U.S. Provisional Application No. 62/450,582, filed on Jan. 26, 2017, which is incorporated herein by reference.

BACKGROUND OF THE INVENTION

1. Field of the Invention

The present invention relates to a communication device and a method used in a wireless communication system, and more particularly, to a communication device and a method of handling a user equipment (UE) access stratum (AS) context.

2. Description of the Prior Art

A long-term evolution (LTE) system provides high data rate, low latency, packet optimization, and improved system capacity and improved coverage. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management (MME), a serving gateway, etc., for Non-Access Stratum (NAS) control.

A LTE-advanced (LTE-A) system is an evolution of the LTE system. The LTE-A system extends cell coverage of an eNB, increases peak data rate and throughput, and includes advanced techniques, such as carrier aggregation (CA), licensed-assisted access (LAA) using LTE, etc.

SUMMARY OF THE INVENTION

The present invention therefore provides a communication device and method for handling a user equipment (UE) access stratum (AS) context to solve the abovementioned problem.

A communication device for handling a UE AS context comprises a storage device for storing instructions and a processing circuit coupled to the storage device. The processing circuit is configured to execute the instructions stored in the storage device. The instructions comprise establishing a radio resource control (RRC) connection with a network; receiving the UE AS context from the network, wherein the UE AS context comprises at least one of a RRC configuration and a security context; receiving a RRCConnectionRelease message configuring the communication device to suspend the RRC connection and enter a RRC_IDLE state or configuring the communication device to enter a RRC_CONNECTED state with a RRC light connection from the network, after receiving the UE AS context; storing the UE AS context, when receiving the RRCConnectionRelease message; restoring the UE AS context, resuming a signalling radio bearer 1 (SRB1) and transmitting a RRCConnectionResumeRequest message to the network, when initiating a RRC connection resume procedure; receiving a RRCConnectionSetup message or a RRCConnectionReject message in response to the RRCConnectionResumeRequest message from the network; and releasing the restored UE AS context and the resumed SRB1 in response to the RRCConnectionSetup message or the RRCConnectionReject message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
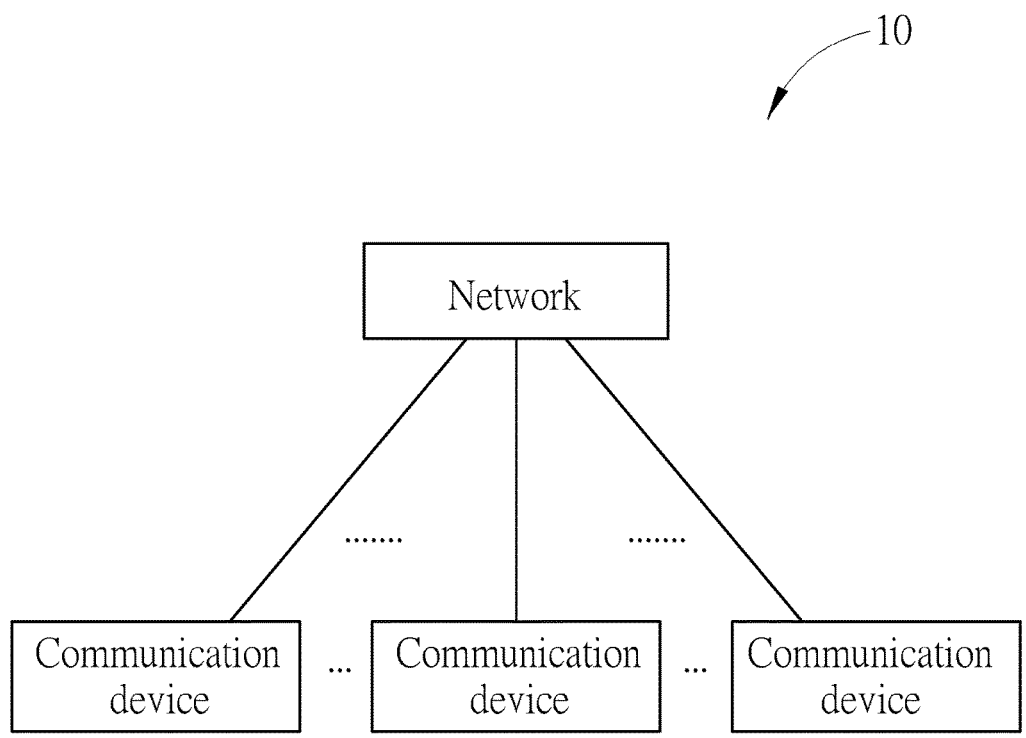
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) including at least one Node-B (NB) and/or a Radio Network Controller (RNC) in a universal mobile telecommunications system (UMTS). In one example, the network may include an evolved UTRAN (E-UTRAN) including at least one evolved NB (eNB). In one example, the network may include a fifth generation (5G) network including at least one 5G base station (BS) (e.g., gNB) which employs orthogonal frequency-division multiplexing (OFDM) and/or non-OFDM, wide bandwidth (e.g., 100 MHz) and transmission time interval smaller than 1 millisecond (ms) (e.g., 100 or 200 microseconds), to communication with the communication devices. In general, a BS may also be used to refer to the eNB or the 5G BS.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
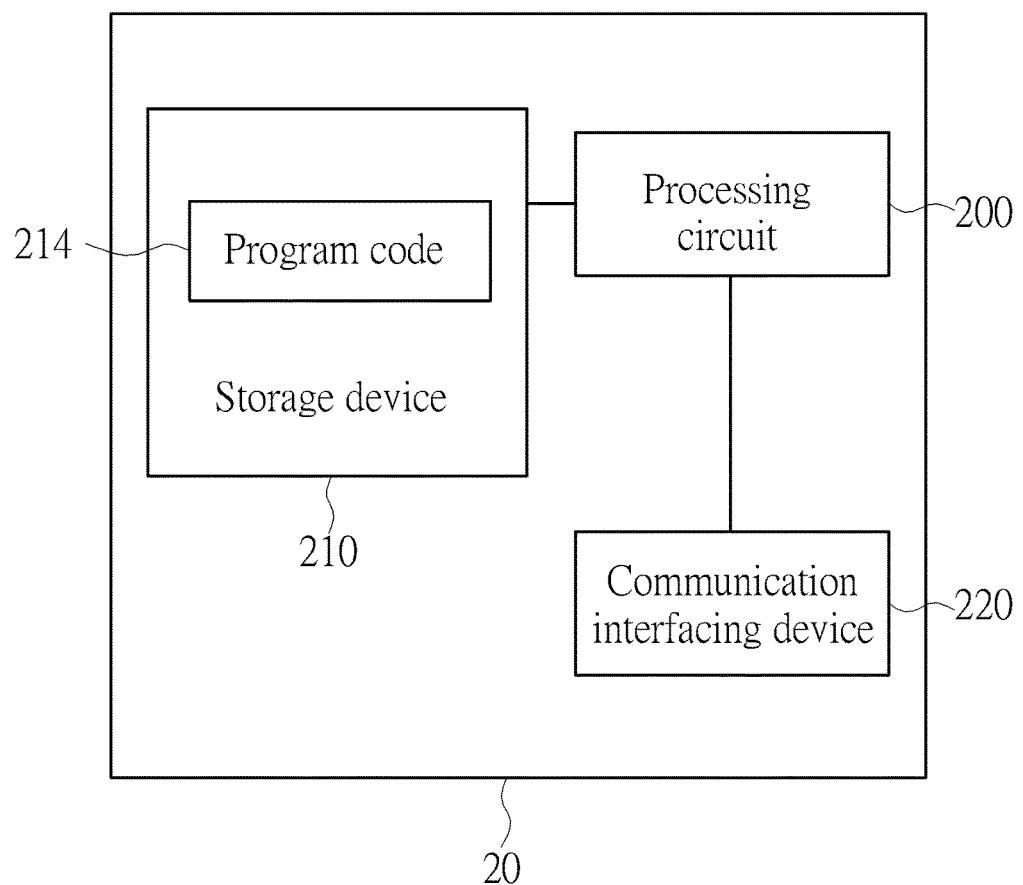
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing device 220 is preferably a transceiver and is used to transmit and receive signals (e.g., data, messages and/or packets) according to processing results of the processing circuit 200.

In the following embodiments, a UE is used for representing a communication device in FIG. 1, to simplify the illustration of the embodiments.

Figure 3:
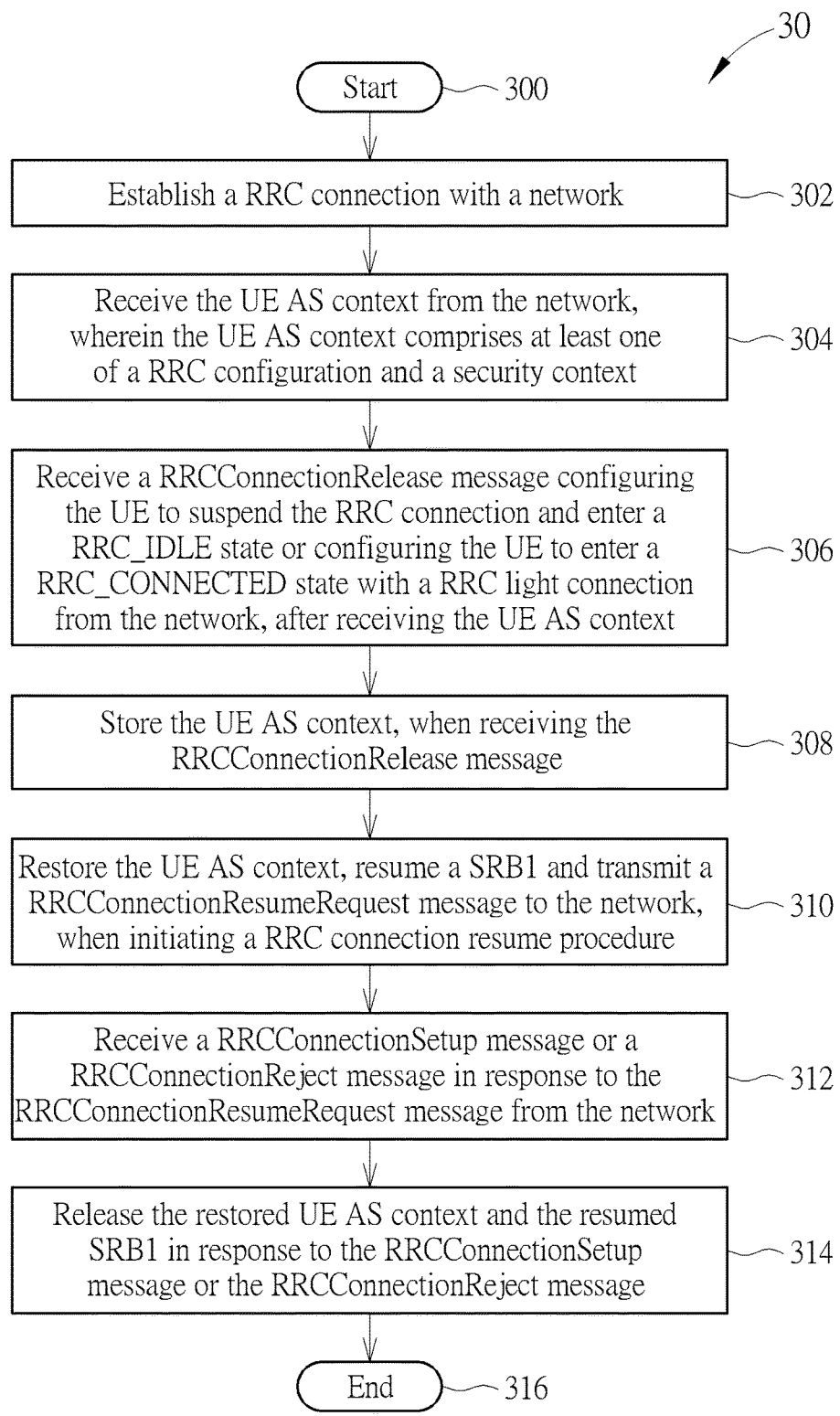
FIG. 3 is a flowchart of a process according to an example of the present invention.

FIG. 3 is a flowchart of a process 30 according to an example of the present invention. The process 30 is utilized in a UE, to handle a UE access stratum (AS) context. The process 30 includes the following steps:

Step 300: Start.

Step 302: Establish a radio resource control (RRC) connection with a network.

Step 304: Receive the UE AS context from the network, wherein the UE AS context comprises at least one of a RRC configuration and a security context.

Step 306: Receive a RRCConnectionRelease message configuring the UE to suspend the RRC connection and enter a RRC_IDLE state or configuring the UE to enter a RRC_CONNECTED state with a RRC light connection from the network, after receiving the UE AS context.

Step 308: Store the UE AS context, when receiving the RRCConnectionRelease message.

Step 310: Restore the UE AS context, resume a signalling radio bearer 1 (SRB1) and transmit a RRCConnectionResumeRequest message to the network, when initiating a RRC connection resume procedure.

Step 312: Receive a RRCConnectionSetup message or a RRCConnectionReject message in response to the RRCConnectionResumeRequest message from the network.

Step 314: Release the restored UE AS context and the resumed SRB1 in response to the RRCConnectionSetup message or the RRCConnectionReject message.

Step 316: End.

According to the process 30, the UE establishes a RRC connection with a network. Then, the UE receives the UE AS context from the network, wherein the UE AS context comprises at least one of a RRC configuration and a security context. The UE receives a RRCConnectionRelease message configuring the UE to suspend the RRC connection and enter a RRC_IDLE state or configuring the UE to enter a RRC_CONNECTED state with a RRC light connection from the network, after receiving the UE AS context. The UE stores the UE AS context, when receiving the RRCConnectionRelease message. The UE restores the UE AS context, resumes a signalling radio bearer 1 (SRB1) and transmits a RRCConnectionResumeRequest message to the network, when initiating a RRC connection resume procedure. Under certain circumstances, the UE receives a RRCConnectionSetup message or a RRCConnectionReject message in response to the RRCConnectionResumeRequest message from the network. The UE releases the restored UE AS context and the resumed SRB1 in response to the RRCConnectionSetup message or the RRCConnectionReject message. That is, the UE stops applying the UE AS context in response to the RRCConnectionSetup message or the RRCConnectionReject message. For example, the UE does not use the restored UE AS context (e.g., the security context) to perform security checks (e.g., an encryption and a decryption) before performing a security activation. Problem in the art regarding incorrect behaviors of the UE and the network is solved.

A scenario according to an example of the present invention is discussed as following. The UE may restore the RRC configuration and the security context in the UE AS context, may restore a packet data convergence protocol (PDCP) state, may reestablish PDCP entities for the SRB1, and may resume the SRB1 when initiating the RRC connection resume procedure. Then, the UE transmits the RRCConnectionResumeRequest message and receives a RRCConnectionResume message according to the SRB1 and the security context. In response to the RRCConnectionResumeRequest message, the network transmits the RRCConnectionSetup message or the RRCConnectionReject message to the UE under the certain circumstances. In this situation, the RRC configuration and the security context in the UE AS context results in incorrect behaviors of the UE and the network. For example, if the UE keeps applying the UE AS context (e.g., a security context) in response to the RRCConnectionSetup message or the RRCConnectionReject message, the UE performs an encryption on messages transmitted on the SRB1 or performs a decryption on messages received on the SRB1. However, the network (e.g., a BS) does not perform the encryption and the decryption, before activating the encryption and the decryption by a security mode procedure. The network is not able to correctly receive the messages transmitted by the UE or to correctly transmit the messages to the UE. Thus, how to handle a UE AS context is an important problem to be solved.

In one example, an enhanced coverage (EC) system information block(s) (SIB(s)) is system information that the network broadcasts for an EC purpose. Legacy SIBs are legacy system information that the network broadcasts for a non-EC UE, e.g., a rel-11 UE or a rel-12 UE.

Realization of the process 30 is not limited to the above description. The following examples may be applied to the process 30.

In one example, the UE AS context includes at least one of the PDCP state, a Cell Radio Network Temporary Identifier (C-RNTI), a cellIdentity and a physical cell identity (PCI). In one example, the PDCP state includes a Robust Header Compression (ROHC) state (e.g., if a ROHC is configured before the UE receives the RRCConnectionRelease message).

In one example, the RRCConnectionRelease message includes a release cause "rrc-Suspend" and does not include a rrc-LightConnectionIndication, to configure the UE to suspend the RRC connection. In one example, the UE releases a RAN-PagingAreaInfo, when the RRCConnectionRelease message includes the release cause "rrc-Suspend" and does not include the rrc-LightConnectionIndication, to configure the UE to suspend the RRC connection. In one example, the RRCConnectionRelease message includes a release cause "rrc-Suspend" and a rrc-LightConnection- Indication configuring the RRC CONNECTED state with the RRC light connection. In one example, the RRCConnectionRelease message includes a UE identity (e.g., resumeIdentity) for the RRC connection resume procedure. In one example, the UE stores the UE identity and the UE AS context, when receiving the RRCConnectionRelease message.

In one example, the UE receives the UE AS context from the network in at least one of a RRCConnectionReconfiguration message, a RRCConnectionSetup message, a RRCConnectionResume message, a RRCConnectionReestablishment message and a SecurityModeCommand message. In one example, the UE performs at least one UE action when leaving the RRC_CONNECTED state, after receiving the RRCConnectionSetup message or the RRCConnectionReject message.

In one example, the UE is a narrow band Internet of Things (NB-IoT) UE, a bandwidth reduced low complexity (BL) UE or a UE in coverage enhancement (CE). In one example, the UE supports a User Plane Cellular IoT (CIoT) evolved packet system (EPS) optimization. In one example, the UE is a new radio (NR) UE, and the RRCConnectionRelease message may request the UE to enter an INACTIVE state.

In one example, the RRC configuration includes at least one of a SRB configuration, a data radio bearer (DRB) configuration, a radio link control (RLC) configuration, a logical channel configuration, a media access control (MAC) configuration, a physical channel configuration, a UE constant, a UE timer, a measurement configuration, a public land mobile network (PLMN) identity, a cellIdentity, a PCI and a system architecture evolution (SAE) Temporary Mobile Subscriber Identity (S-TMSI). The UE constant may include at least one of N310, N311, N313 and N314. The UE timer may include at least one of T300, T301, T302, T303, T304, T305, T306, T307, T308, T310, T311, T312, T313, T320, T321, T330, T340, T350, T351, T360 and T370. In one example, the security context may include at least one of an integrity protection algorithm, an integrity protection key, a ciphering algorithm, a ciphering key, a nextHop-ChainingCount value, a BEARER value, a DIRECTION value, a COUNT value, a PDCP sequence number (SN), a ProSe Traffic Key (PTK) Identity, a ProSe Group Key (PGK) Index, a Message Authentication Code for Integrity (MAC-I), a short MAC-I, a C-RNTI, a cellIdentity and a PCI value. The integrity protection algorithm may include at least one of EIA0, EIA1, EIA2 and EIA3. The integrity protection key may include at least one of $K_{ASME}$, $K_{eNB}$, $K_{UPint}$ and $K_{RRCint}$. The ciphering algorithm may include at least one of EEA0, EEA1, EEA2 and EEA3. The ciphering key may include at least one of $K_{ASME}$, $K_{eNB}$, $K_{RRCenc}$ and $K_{UPenc}$.

In one example, the UE discards the UE AS context and a resumeIdentity, indicates that the RRC connection resume procedure is fallbacked to at least one upper layer, and transmits a RRCConnectionSetupComplete message to the network after receiving the RRCConnectionSetup message. In one example, the UE informs at least one upper layer about a failure to resume the RRC connection with a suspend indication and that an access barring for mobile originating calls, a mobile originating signaling and a mobile terminating access and except for a NB-IoT for a mobile originating circuit switched (CS) fallback is applicable, after receiving the RRCConnectionReject message. In one example, the UE discards the UE AS context and a resumeIdentity, when a rrc-SuspendIndication is not in the RRCConnectionReject message. The UE may maintain the UE AS context and the resumeIdentity, when the rrc-SuspendIndication is in the RRCConnectionReject message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a UE AS context. The UE stops applying the UE AS context in response to the RRCConnectionSetup message or the RRCConnectionReject message. Thus, problem in the art regarding incorrect behaviors of the UE and the network is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a user equipment (UE) access stratum (AS) context, comprising:
   a storage device, for storing instructions of:
   establishing a radio resource control (RRC) connection with a network;
   receiving the UE AS context from the network, wherein the UE AS context comprises at least one of a RRC configuration and a security context;
   receiving a RRCConnectionRelease message configuring the communication device to suspend the RRC connection and enter a RRC_IDLE state or configuring the communication device to enter a RRC_CONNECTED state with a RRC light connection from the network, after receiving the UE AS context;
   storing the UE AS context, when receiving the RRCConnectionRelease message;
   restoring the UE AS context, resuming a signalling radio bearer 1 (SRB1) and transmitting a RRCConnectionResumeRequest message to the network, when initiating a RRC connection resume procedure;
   receiving a RRCConnectionSetup message or a RRCConnectionReject message in response to the RRCConnectionResumeRequest message from the network; and
   releasing the restored UE AS context and the resumed SRB1 in response to the RRCConnectionSetup message or the RRCConnectionReject message; and
   a processing circuit, coupled to the storage device, configured to execute the instructions stored in the storage device.

2. The communication device of claim 1, wherein the UE AS context comprises at least one of a packet data convergence protocol (PDCP) state, a Cell Radio Network Temporary Identifier (C-RNTI), a cellIdentity and a physical cell identity (PCI).

3. The communication device of claim 2, wherein the PDCP state comprises a Robust Header Compression (ROHC) state.

4. The communication device of claim 1, wherein the RRCConnectionRelease message comprises a release cause "rrc-Suspend" and does not comprise a rrc-LightConnectionIndication, to configure the communication device to suspend the RRC connection.

5. The communication device of claim 4, wherein the storage device further stores the instruction of:
   releasing a RAN-PagingAreaInfo, when the RRCConnectionRelease message comprises the release cause "rrc-Suspend" and does not comprise the rrc-LightConnectionIndication to configure the communication device to suspend the RRC connection.

6. The communication device of claim 1, wherein the RRCConnectionRelease message comprises a release cause "rrc-Suspend" and a rrc-LightConnectionIndication configuring the RRC_CONNECTED state with the RRC light connection.

7. The communication device of claim 1, wherein the RRCConnectionRelease message comprises a UE identity for the RRC connection resume procedure.

8. The communication device of claim 7, wherein the communication device stores the UE identity and the UE AS context, when receiving the RRCConnectionRelease message.

9. The communication device of claim 1, wherein the communication device receives the UE AS context from the network in at least one of a RRCConnectionReconfiguration message, a RRCConnectionSetup message, a RRCConnectionResume message, a RRCConnectionReestablishment message and a SecurityModeCommand message.

10. The communication device of claim 1, wherein the storage device further stores the instruction of:
    performing at least one UE action when leaving the RRC CONNECTED state, after receiving the RRCConnectionSetup message or the RRCConnectionReject message.

11. The communication device of claim 1, wherein the communication device is a narrow band Internet of Things (NB-IoT) communication device, a bandwidth reduced low complexity (BL) communication device or a communication device in coverage enhancement (CE).

12. The communication device of claim 1, wherein the communication device supports a User Plane Cellular IoT (CIoT) evolved packet system (EPS) optimization.

13. The communication device of claim 1, wherein the communication device is a new radio (NR) communication device, and the RRCConnectionRelease message requests the communication device to enter an INACTIVE state.

14. The communication device of claim 1, wherein the RRC configuration comprises at least one of a SRB configuration, a data radio bearer (DRB) configuration, a radio link control (RLC) configuration, a logical channel configuration, a media access control (MAC) configuration, a physical channel configuration, a communication device constant, a communication device timer, a measurement configuration, a public land mobile network (PLMN) identity, a cellIdentity, a PCI and a system architecture evolution (SAE) Temporary Mobile Subscriber Identity (S-TMSI).

15. The communication device of claim 1, wherein the security context comprises at least one of an integrity protection algorithm, an integrity protection key, a ciphering algorithm, a ciphering key, a nextHopChainingCount value, a BEARER value, a DIRECTION value, a COUNT value, a PDCP sequence number (SN), a ProSe Traffic Key (PTK) Identity, a ProSe Group Key (PGK) Index, a Message Authentication Code for Integrity (MAC-I), a short MAC-I, a C-RNTI, a cellIdentity and a PCI value.

16. The communication device of claim 1, wherein the storage device further stores the instruction of:
    discarding the UE AS context and a resumeIdentity;
    indicating that the RRC connection resume procedure is fallbacked to at least one upper layer; and
    transmitting a RRCConnectionSetupComplete message to the network, after receiving the RRCConnectionSetup message.

17. The communication device of claim 1, wherein the storage device further stores the instruction of:
    informing at least one upper layer about a failure to resume the RRC connection with a suspend indication and that an access barring for mobile originating calls, a mobile originating signaling and a mobile terminating access and except for a NB-IoT for a mobile originating circuit switched (CS) fallback is applicable, after receiving the RRCConnectionReject message.

18. The communication device of claim 1, wherein the storage device further stores the instructions of:
    discarding the UE AS context and a resumeIdentity, when a rrc-SuspendIndication is not in the RRCConnectionReject message; and
    maintaining the UE AS context and the resumeIdentity, when the rrc-SuspendIndication is in the RRCConnectionReject message.

* * * * *